United States Patent Office 3,240,709
Patented Mar. 15, 1966

3,240,709
METHOD OF CLEANSING CONTACT LENSES
Billy F. Rankin, Wheaton, Md., assignor to Burton Parsons Chemicals, Inc., Washington, D.C., a corporation of Delaware
No Drawing. Continuation of application Ser. No. 195,335, May 16, 1962. This application Aug. 31, 1964, Ser. No. 393,409
2 Claims. (Cl. 252—106)

This application is a continuation of my application Ser. No. 195,335, filed May 16, 1962; a continuation-in-part of my application Ser. No. 24,667, filed April 26, 1960, both now abandoned.

The present invention relates to a cleansing composition for contact lenses and like opthalmic apparatus, particularly a cleansing composition which may be utilized for the removal of crystalline tear stain from contact lenses.

It is reliably estimated that contact lens users in the United States presently number more than 6,000,000 individuals. A widespread problem in use of contact lenses develops in removing crystalline tear stain from the lens. The continuous cleansing action of the eye results in continuous dripping of tear deposits which crystallize on the surfaces of the contact lens. These deposits when crystallized blur the lens, thus obstructing vision, and may irritate the inner surface of the human eyelid. Conventional detergents have not been effective in dissolving the crystalline tear deposits for removal. Therefore, such deposits have been dissolved by the application of kerosene, which, in turn, has been removed by soap and water. Alternatively, the crystalline tear deposits may be removed by a light or fine buffing, effected only by delicate laboratory apparatus, which necessitates the return of the lens to the optometrist's laboratory.

The present cleansing composition is comprised of wetting agents which readily dissolve crystalline tear deposits, without harming the contact lens ingredients. This cleansing composition is buffered to the pH range of the human tear (pH 6.2 to 7.2). A principal ingredient of the cleansing solution is methylcellulose, which is of 4,000 centipoises, has great ability to lower the surface tension of water and is nonreactant with conventional opthalmic buffering agents. Previously methylcellulose has been used as a filler or suspending agent in chemical compositions. More recently the retentive qualities of methylcellulose have been recognized to the extent that it has been used in the topical application of medication to the human body. However, it is submitted that capabilities of methylcellulose as a cleansing medium have been heretofore unrecognized.

Accordingly, it is an object of invention to provide a cleansing composition for contact lenses which is neither reactant with the ingredients of the lenses.

Another object of invention is to provide a cleansing composition which will dissolve crystalline tear deposit from opthalmic apparatus.

Another object of invention is to provide in a cleansing composition for opthalmic apparatus a combination of wetting agents which are buffered to tear pH.

Yet additional objects of invention will become apparent from the ensuing specification.

A suggested mode of preparation of the present cleansing composition is as follows:

A sodium biphosphate solution ($NaH_2PO_4$) is prepared by the addition of 8 grams anhydrous sodium biphosphate to 1,000 ccs. of distilled water.

A sodium phosphate solution is prepared by the addition of 9.47 grams anhydrous sodium phosphate ($Na_2HPO_4$) to 1,000 ccs. of distilled water.

Three parts of the sodium biphosphate and 7 parts of the sodium phosphate solutions thus prepared are mixed, then 10 grams of powdered methylcellulose may be added to the solution. The solution is heated lightly until the methylcellulose is thoroughly wetted, then refrigerated until the methylcellulose is in solution. To this resultant solution sodium chloride in the range of 0.45 to 0.5% may be added to instill isotonic properties and benzalkonium chloride in the range of 0.01 to 0.05% by weight may be added as a sterilizer and preservative.

A solution thus prepared will have a pH range of 6.2 to 7.2, the latter limit being equivalent to the pH of the human tear.

It has been found that the following percentage weights of the sodium biphosphate ($NaH_2PO_4$) and sodium phosphate ($Na_2HPO_4$) ingredients may be employed for buffering in the pH range 6.2 to 7.2:

| | Ingredients | Percentage weights | pH |
|---|---|---|---|
| 1 | Sodium biphosphate | 0.64 | 6.2 |
| | Sodium phosphate | 0.188 | |
| 2 | Sodium biphosphate | 0.56 | 6.4 |
| | Sodium phosphate | 0.283 | |
| 3 | Sodium biphosphate | 0.48 | 6.6 |
| | Sodium phosphate | 0.378 | |
| 4 | Sodium biphosphate | 0.40 | 6.8 |
| | Sodium phosphate | 0.473 | |
| 5 | Sodium biphosphate | 0.32 | 7.0 |
| | Sodium phosphate | 0.568 | |
| 6 | Sodium biphosphate | 0.24 | 7.2 |
| | Sodium phosphate | 0.663 | |

A drop or two of the cleansing solution may be added to each side of the contact lens. Then the lens may be rubbed lightly between the user's forefinger and thumb. Almost immediately the crystalline tear deposit will be dissolved and the entire contact lens may be cleansed in running water. The solution thus prepared will remain stable and it may be used repetitively on contact lenses without damage to the lens.

The cleansing capability of the solution is greater in the lower pH range of 6.2 to 7.2, because the tear itself is slightly acidic. 0.5 to 1% is the suggested content of methylcellulose by weight. This provides minimum viscosity of the solution, thereby enhancing its cleansing ability.

Manifestly, the proportions of the wetting agent ingredients, sodium chloride and benzalkonium chloride additives may be altered without departing from the spirit and scope of invention, as defined in the subjoined claims.

I claim:

1. A method of removing crystalline tear deposits from a contact lens comprising the steps of: (1) applying to the sides of the lens a composition consisting essentially of approximately 1% by weight methyl-cellulose having a viscosity of about 4000 centipoises in a water solution of about 0.45 to 0.5% sodium chloride buffered to a pH of between 6.2 and 7.2 by a combination of about 0.64 to 0.24% sodium biphosphate and about 0.188 to 0.663% sodium phosphate; (2) lightly rubbing said lenses to insure full cleansing; and, (3) subjecting the thus treated lens to water washing whereby all deposits are removed and a non-irritating, blur free lens provided for the human eye.

2. A method according to claim 1 wherein the composition of step (1) includes from 0.01 to 0.05% benzalkonium chloride as a sterilizer and preservative.

(References on following page)

References Cited by the Examiner

UNITED STATES PATENTS 2,547,653    4/1951    Minnis et al.  ---------- 167—59
3,171,752    3/1965    Rankin  ------------ 106—194

OTHER REFERENCES

Lesser: "Cellulose Derivatives in Soap," in "Soap and Sanitary Chemicals," August 1950, pp. 29–31.

"Methocel," publ. of Dow Chemical Co., 1957, pp. 15, 20, 23, 30, 33, and 34.

Mueller et al.: J. Am. Pharm. Assn., Scientific Edition, vol. 45, No. 5, May 1956, pp. 334 to 336.

"Remington's Practice of Pharmacy," 9th ed., 1948, pp. 230–233.

"Remington's Practice of Pharmacy," 11th ed., 1956, page 294.

JULIUS GREENWALD, *Primary Examiner.*

ALBERT T. MEYERS, *Examiner.*